(12) United States Patent
Oomori et al.

(10) Patent No.: US 6,480,199 B1
(45) Date of Patent: Nov. 12, 2002

(54) IMAGE PROCESSING APPARATUS

(75) Inventors: Mutsuhiro Oomori, Kanagawa (JP); Yu Kato, Kanagawa (JP); Katsuya Kita, Kanagawa (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 09/332,096

(22) Filed: Jun. 14, 1999

(30) Foreign Application Priority Data

Jun. 25, 1998 (JP) .............................. 10-178559

(51) Int. Cl.$^7$ ................... G06F 13/00; G06T 15/00
(52) U.S. Cl. .................. 345/536; 345/503; 345/531; 345/519; 345/419
(58) Field of Search .................. 345/536, 530–32, 345/543–44, 541–552, 560–4, 571, 419, 582, 503, 505, 519, 531

(56) References Cited

U.S. PATENT DOCUMENTS

| | | | |
|---|---|---|---|
| 5,239,654 A | | 8/1993 | Ing-Simmons et al. ..... 395/800 |
| 5,371,519 A | * | 12/1994 | Fisher ......................... 345/203 |
| 5,544,306 A | * | 8/1996 | Deering et al. ............. 345/531 |
| 5,867,180 A | * | 2/1999 | Katayama et al. .......... 345/512 |
| 5,883,814 A | * | 3/1999 | Luk et al. ....................... 716/2 |
| 6,271,875 B1 | * | 8/2001 | Shimizu et al. .............. 348/42 |

FOREIGN PATENT DOCUMENTS

| | | |
|---|---|---|
| EP | 935 252 A1 | 8/1999 |
| WO | 97/35316 | 9/1997 |
| WO | 98/19308 | 5/1998 |

OTHER PUBLICATIONS

Luk, W. T., et al, "Development of a High Bandwidth Merged Logic/DRAM Multimedia Chip", Oct., 1997, IEEE, Computer Design: VLSI in Computers & Processors, 1997 Proceedings, International Conference on Computer Design, pp. 279–285.*

* cited by examiner

Primary Examiner—Ulka J. Chauhan
(74) Attorney, Agent, or Firm—Rader, Fishman & Grauer PLLC; Ronald P. Kananen, Esq.

(57) ABSTRACT

An image processing apparatus which can effectively use a storage circuit provided together with a logic circuit, perform high speed processing, and reduce the power consumption without causing a decline in the performance. The image processing system includes a DRAM for storing image data and a logic circuit, which are provided together on a semiconductor chip. The DRAM is divided into a plurality of DRAM modules, and the divided plurality of DRAM modules are arranged around a logic circuit portion for carrying out graphic drawing processing etc. When the ratio of valid data occupying bit lines in one access increases, the distances from the DRAM modules to the logic circuit portion become uniform, the length of the longest path interconnection can be made shorter comparing with the case of arrangement fixed in one direction, and the overall operating speed can be improved.

36 Claims, 13 Drawing Sheets

SIDE EXTENDING THE LONGEST IN Y-DIRECTION IS SIDE AC

FIG.4
TRIANGLES ARE DIVIDED TO THREE KINDS
ONE UPPER-MOST POINT, AND CONTINUOUS SIDE IS ON THE LEFT
TOP SIDE IS HORIZONTAL (SIDE ON THE LEFT IS BASE)
ONE UPPER-MOST POINT, AND CONTINUOUS SIDE IS ON THE RIGHT
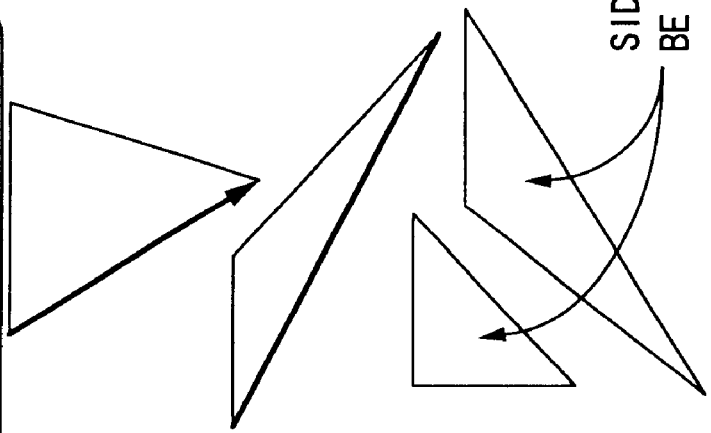
SIDE ON THE RIGHT CAN BE BASE IN THIS CASE
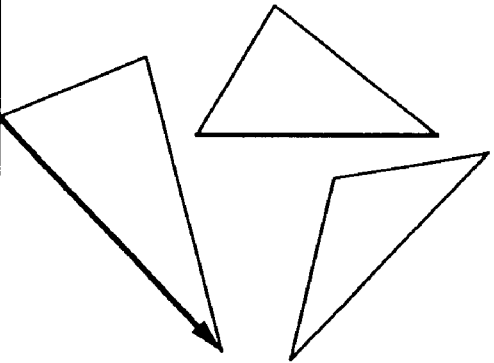

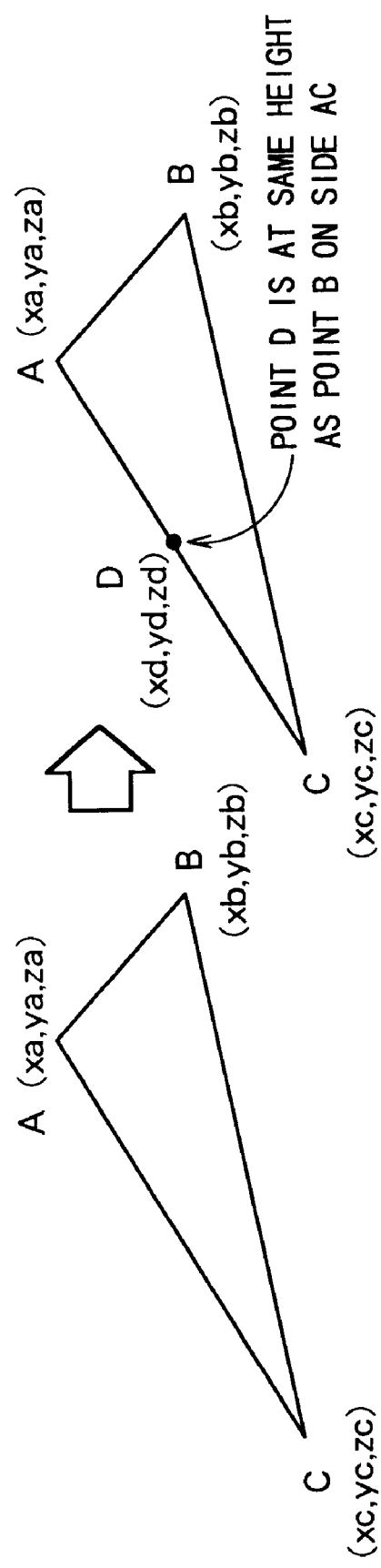

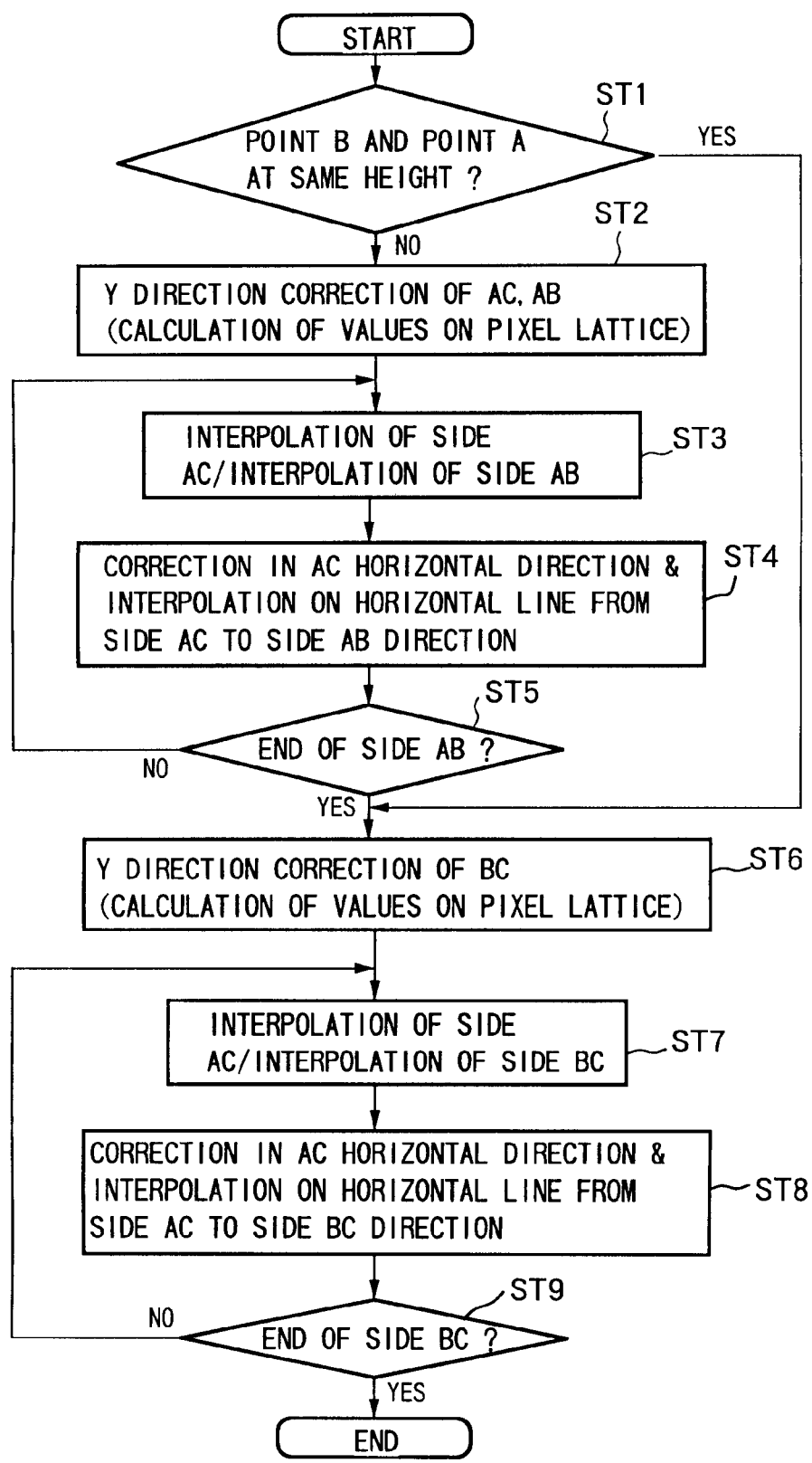

IMAGE PROCESSING APPARATUS

BACKGROUND OF THE INVENTION

1. Field of the Invention

The present invention relates to a graphic image processing apparatus, more specifically relates to the technical field of arrangement and interconnection of a built-in memory especially in the case where a DRAM or other memory and a logic circuit are provided together.

2. Description of the Related Art

Computer graphics are often used in a variety of CAD (computer aided design) systems and amusement machines. Especially, along with the recent advances in image processing techniques, systems using three-dimensional computer graphics are becoming rapidly widespread.

In three-dimensional computer graphics, the color value of each pixel is calculated at the time of deciding the color of each corresponding pixel. Then, rendering is performed for writing the calculated value to an address of a display buffer (frame buffer) corresponding to the pixel.

One of the rendering methods is polygon rendering. In this method, a three-dimensional model is expressed as a composite of triangular unit graphics (polygons). By drawing using the polygons as units, the colors of the pixels of the display screen are decided.

In polygon rendering, coordinates (x, y, z), color data (R, G, B), homogeneous coordinates (s, t) of texture data indicating a composite image pattern, and a value of the homogeneous term q for the respective vertexes of the triangle in a physical coordinate system are input and processing is performed for interpolating these values inside the triangle.

Here, coordinates in a UV coordinate system of an actual texture buffer, namely, texture coordinate data (u, v), are comprised of the homogeneous coordinates (s, t) divided by the homogeneous term q to give "s/q" and "t/q" which in turn are multiplied by texture sizes USIZE and VSIZE, respectively.

FIG. 11 is a view of the system configuration of the basic concept of a three-dimensional computer graphic system.

In the three-dimensional computer graphic system, data for drawing a graphic image is given from a main memory 2 of a main processor 1 or an I/O interface circuit 3 for receiving external graphic data to a rendering circuit 5 having a rendering processor 5a and a frame buffer 5b via a main bus 4.

The rendering processor 5a is connected to a frame buffer 5b intended to hold data for display and a texture memory 6 for holding texture data to be applied on the surface of a graphic element to be drawn (for example, a triangle).

The rendering processor 5a is used to perform the processing for drawing a graphic element with a texture applied to its surface in the frame buffer 5b for every graphic element.

The frame buffer 5b and the texture memory 6 are generally composed by a dynamic random access memory (DRAM).

In the system shown in FIG. 11, the frame buffer 5b and the texture memory 6 are configured as physically separate memory systems.

Recently, it has become possible to provide a DRAM and a logic circuit together. Looking at graphic drawing image processing apparatuses, as shown in FIG. 12, there are ones attempting to build a DRAM or other large capacity memory 7a on the same semiconductor chip 7 as a drawing use logic circuit 7b while keeping the previous structure of use of an external memory as it is.

In this case, a DRAM core having an equivalent control mechanism as a general-purpose DRAM is simply arranged next to the prior graphic drawing image processing logic circuit and the two are interconnected by a single path.

There are only the above types in the case of graphic drawing image processing apparatuses.

Below, although the technical field is different from that of a graphic drawing image processing apparatus, the trends in the field of microprocessors will be described.

In the past, it has been proposed to provide a microprocessor and a memory on a single chip. Proposals have also been made regarding the arrangement of the memory on the chip.

For example, in a PPRAM (ISSCC97/SESSION14/Parallel Processing RAM), as shown in FIG. 13, DRAMs $8a$-1 to $8a$-4 serving as main memories and microprocessors (P) $8b$-1 to $8b$-4 are built in on the same semiconductor chip 8.

Note that, in FIG. 13, reference numerals $8c$-1 to $8c$-4 indicate memory controllers (Mem CTL) of the DRAMs $8a$-1 to $8a$-4, and $8d$-1 to $8d$-4 indicate caches.

In this semiconductor chip 8, the DRAMs $8a$-1 to $8a$-4 serving as the main memories are arranged in only one direction with respect to the microprocessors $8b$-1 to $8b$-4.

Also, FIG. 13 shows a configuration wherein a plurality of microprocessors $8b$-1 to $8b$-4 access single DRAMs via the caches $8d$-1 to $8d$-4.

Turning to the problems to be solved by the invention, in the above conventional so-called built-in DRAM system, however, when a frame buffer memory and a texture memory are separated into different memory systems, there is a disadvantage that the frame buffer emptied due to a change of the display resolution cannot be used for the texture. Alternatively, when the frame memory and the texture memory are physically combined, the overhead of the page exchange of the DRAM etc. becomes large at the time of simultaneous success of the frame memory and the texture memory, so there is a disadvantage that the performance has to be sacrificed.

Also, with a method of interconnection wherein a DRAM core having a control mechanism equivalent to a general-purpose DRAM is arranged next to a graphic image processing logic circuit and the two are connected by a single path, the bandwidth for accessing is not improved at all in spite of the trouble of building in the DRAM and becomes a bottleneck in system performance.

Furthermore, a built-in main memory type microprocessor has the following disadvantages:

Namely, the semiconductor chip 8 has four units of the same functional configuration aligned with each other and transfers data through the memory controllers. The bandwidths of the transfer are determined by the path widths of the memory controllers and the operating speeds. The fastest path is one cutting straight across the chip. The operating speed is determined by the longest path. Therefore, improvement of the operating speed becomes difficult. Long paths naturally occupy a greater area in the layout.

The trend has been for the speed of microprocessors to double every 18 months and for the memory capacity to also double about every 18 months.

In spite of this situation, the access time increases about 7% per year. How to make the access time faster is now becoming the key to improving the system performance.

In the above conventional method, the larger the chip, the longer the critical path and therefore the more the operating speed ends up being hampered.

Accordingly, the access time between DRAMs is left unimproved, so the merits of building in DRAMs do not appear that much.

SUMMARY OF THE INVENTION

An object of the present invention is to provide an image processing apparatus capable of effectively utilizing a storage circuit provided together with a logic circuit and enabling an increase of the operating speed and reduction of the power consumption without causing a deterioration of performance.

According to a first aspect of the present invention, there is provided an image processing apparatus comprising a storage circuit divided into a plurality of storage modules, each storage module storing image data of different pixels and a logic circuit for performing predetermined processing on the image data based on the stored data of the storage circuit, the storage circuit and the logic circuit being both accommodated on one semiconductor chip, and the plurality of divided storage modules arranged at peripheral portions of the logic circuit.

According to a second aspect of the invention, there is provided an image processing apparatus for performing rendering by receiving polygon rendering data including three-dimensional coordinates (x, y, z), R (red), G (green), and B (blue) data, homogeneous coordinates (s, t) of texture, and a homogeneous term q for vertexes of a unit graphic; comprising a storage circuit divided into a plurality of storage modules, each storage module storing display data of different pixels and texture data required by at least one graphic element and a logic circuit comprising at least an interpolation data generating circuit for performing interpolation on the polygon rendering data of the vertexes of the unit graphic to generate interpolation data of pixels positioned inside the unit graphic and a texture processing circuit for dividing the homogeneous coordinates (s, t) of texture included in the interpolation data by the homogeneous term q to generate "s/q" and "t/q", using texture addresses in accordance with the "s/q" and "t/q" to read texture data from the storage circuit, and performing processing for applying the texture data to the surface of the graphic elements of the display data, and the storage circuit and the logic circuit being both accommodated on one semiconductor chip, and having the plurality of divided storage modules arranged at peripheral portions of the logic circuit.

Preferably, the logic circuit is divided into a plurality of pixel processing blocks corresponding to the storage modules and each corresponding pixel processing block is closely arranged to each storage module.

Preferably, further provision is made of a secondary memory capable of storing stored data of a storage module and the secondary memory is closely arranged to the storage module.

Preferably, a pixel processing block performs at least one stage of pipeline processing therein.

Preferably, the storage modules are arranged at peripheral portions of the logic circuit so as to surround the logic circuit and wherein input/output terminals are arranged at the inside edges facing the logic circuit.

Preferably, the plurality of pixel processing blocks, even if for modules having the same function, are changed in the positions of their terminals for taking out paths so as to enable paths to be optimally laid to pixel processing blocks using paths from the storage modules.

Preferably, there is further provided a control block equivalently connected to all of the storage modules for controlling the operations of the above plurality of storage modules and that control block is arranged close to a center point surrounded by the storage modules.

Preferably, the storage circuit is accessed based on a row address and a column address; the logic circuit is divided into a plurality of pixel processing blocks corresponding to the storage modules, a corresponding pixel processing block being closely arranged at each storage module; there is a secondary memory capable of storing the stored data of a storage module, which secondary memory is arranged close to a storage module; the storage module is arranged so that its longitudinal direction is the column direction of a core; and the pixel processing block and the secondary memory are arranged close to each other on the same side of the long side of the storage module.

Explained from another angle, in the present invention, the storage circuit is composed of a plurality of independent modules. Due to this, the ratio of valid data held in a bit line in one access increases comparing with the case where accesses have to be made simultaneously.

The plurality of divided storage modules are arranged at the peripheral portions of the logic circuit portion for carrying out graphic drawing processing etc.

As a result, the distances from the respective storage modules to the logic circuit portion become uniform and the length of the longest path interconnection is shortened compared with the case where the modules are all arranged in one direction. Therefore, the operating speed as a whole is improved.

Also, a function block for controlling pixel processing in the graphic drawing is arranged close to each of the storage modules of the storage circuit.

Therefore, read/modify/write processing, which is carried out for an extremely large number of times in graphic processing, can be performed in a very short interconnection region. Therefore, the operating speed is strikingly improved.

At each storage module, a secondary memory is closely arranged to the module.

Due to this, even when data is transferred from a storage circuit to a secondary memory by a path having a very wide width, there is little effect of so-called cross talk. Also, since the interconnection length is naturally short, the operating speed is improved. Further, the area occupied by the interconnections becomes small as well.

By having a function block for controlling the pixel processing in the graphic drawing perform at least one stage of pipeline processing therein, even if the distance to a block carrying out other graphic processing arranged at the center becomes long on an average, it is possible to eliminate the effect on the through-put for processing data and therefore the processing speed is improved.

Further, the input/output terminals at the modules arranged at the peripheral portions of the logic circuit portion for carrying out the graphic drawing processing etc. so as to surround the same are arranged at the inner sides facing the logic circuit portion.

Due to this, the interconnection region is orderly and the average interconnection length becomes shorter.

Also, a plurality of function blocks for controlling the pixel processing, even if they are for modules having the same function, are changed in the positions of their terminals for taking out paths so as to enable paths to be optimally laid to function blocks using paths from the modules.

Due to this, even if the same in function, the terminals of the blocks can be arranged at the optimal positions for the locations of arrangement of the blocks, so the average interconnection length becomes shorter.

Also, the block having the largest number of interconnections among blocks equally connected to all of the storage modules is arranged close to the center point surrounded by the storage circuits.

As a result, the area occupied by the interconnections becomes smaller and the longest interconnection length becomes shorter. Therefore, the operating speed can be simultaneously improved as well.

When, for every module, a function block for controlling the pixel processing in the graphic drawing and a secondary memory are closely arranged to the storage module, the storage modules are arranged so that their longitudinal directions becomes the same as the column direction of a core of the storage circuit (for example, DRAM).

As a result, comparing with arrangement in the row direction, by just specifying the row address, the one row's worth of data corresponding to that row address can be loaded into the secondary memory at one time, that is, the number of bits is dramatically increased.

The pixel processing block and the secondary memory are closely arranged to each other on the same side of a longitudinal side of the storage module.

As a result, data to the pixel processing block and the secondary memory can use the same sense amplifier. Therefore, the increase of the area of the core of the storage circuit can be kept to a minimum and two ports become possible.

BRIEF DESCRIPTION OF THE DRAWINGS

These and other objects and features of the present invention will become clearer from the following description of the preferred embodiments given with reference to the attached drawings, in which:

FIG. 4 is a view for explaining sorting of vertexes of the triangle DDA circuit according to the present invention;

FIG. 5 is a view for explaining inclination calculation in the horizontal direction of the triangle DDA circuit according to the present invention;

FIG. 7 is a flow chart for explaining the interpolation routine of vertex data of the triangle DDA circuit according to the present invention;

DESCRIPTION OF THE PREFERRED EMBODIMENTS

Below, in the present embodiment, an explanation will be made of a three-dimensional computer graphic system which is applied to a personal computer and the like and is able to display a desired three-dimensional image of any three-dimensional object model on a display such as a cathode ray tube (CRT) at a high speed.

Figure 1:
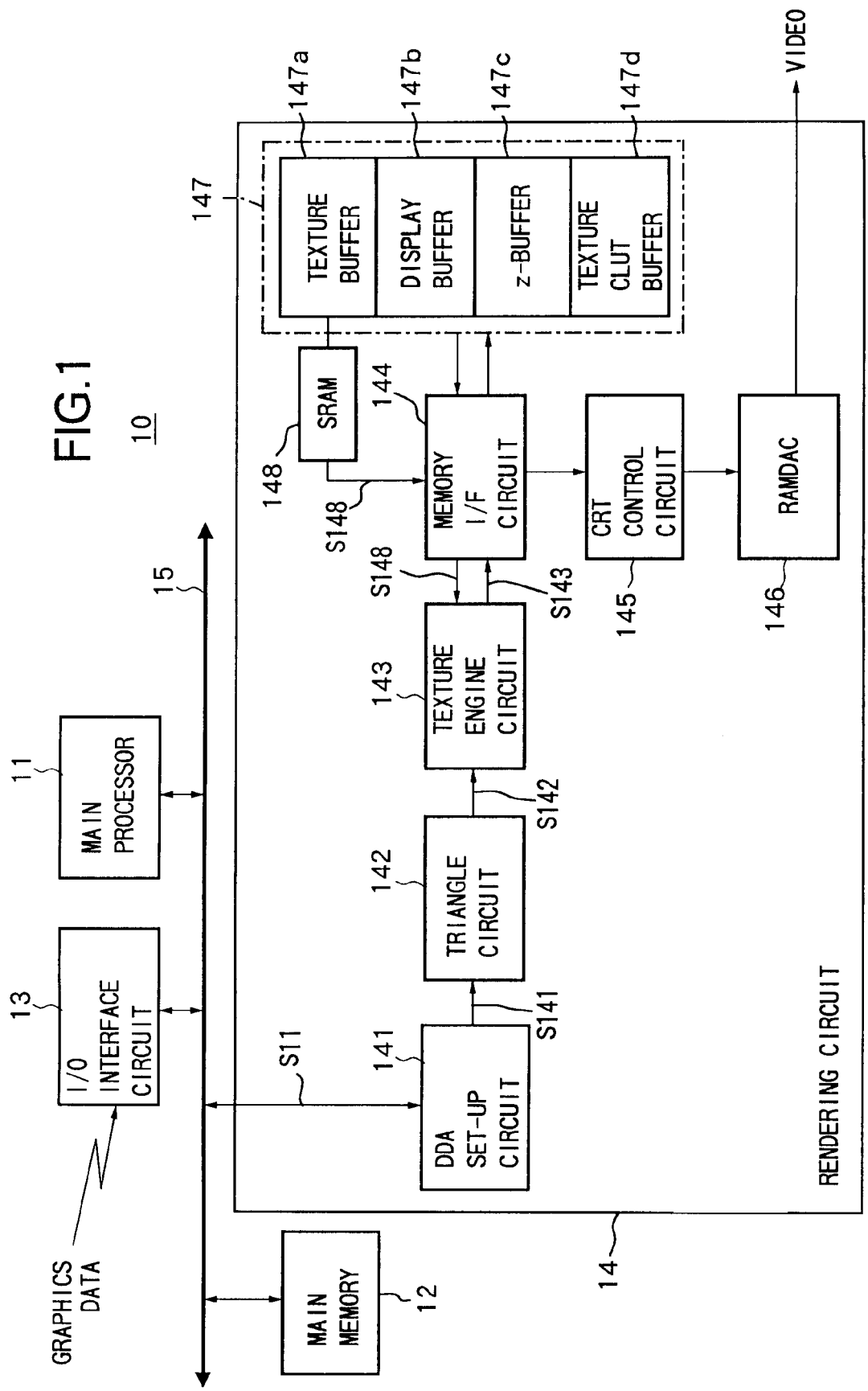
FIG. 1 is a block diagram of the configuration of a three-dimensional computer graphic system according to the present invention.

FIG. 1 is a view of the system configuration of a three-dimensional computer graphic system 10 serving as an image processing apparatus according to the present invention.

In the three-dimensional computer graphic system 10, a three-dimensional model is expressed by a composite of triangular unit graphics (polygons). By drawing the polygons, this system can decide the color of each pixel on the display screen and perform polygon rendering for display on the screen.

In the three-dimensional computer graphic system 10, a three-dimensional object is expressed by using a z-coordinate for indicating the depth in addition to the (x, y) coordinates for indicating positions on a two-dimensional plane. Any one point of the three dimensional space can be expressed by the three coordinates (x, y, z).

As shown in FIG. 1, the three-dimensional computer graphic system 10 is comprised of a main memory 12, an I/O interface circuit 13, and a rendering circuit 14 connected via a main bus 15.

Below, the operations of the respective components will be explained.

The main processor 11, for example, in accordance with the state of progress in a game, reads the necessary graphic data from the main memory 12 and performs clipping, lighting, geometrical processing, etc. on the graphic data to generate polygon rendering data. The main processor 11 outputs the polygon rendering data S11 to the rendering circuit 14 via the main bus 15.

The I/O interface 13 receives as input motion control information or the polygon rendering data from the outside in accordance with need and outputs the same to the rendering circuit 14 via the main bus 15.

Here, the polygon rendering data includes data of each of the three vertexes (x, y, z, R, G, B, s, t, q) of the polygon.

Here, the (x, y, z) data indicates the three-dimensional coordinates of a vertex of the polygon, and (R, G, B) data indicates the luminance values of red, green, and blue at the three-dimensional coordinates, respectively.

Among the (s, t, q) data, the (s, t) indicates homogeneous coordinates of a corresponding texture and the q indicates the homogenous term. Here, the texture size USIZE and VSIZE are respectively multiplied with the "s/q" and "t/q"

to obtain coordinate data (u, v) of the texture. The texture coordinate data (u, v) is used for accessing the texture data stored in the texture buffer 147a.

Namely, the polygon rendering data indicates physical coordinate values of the vertexes of a triangle and values of colors of the vertexes and texture data.

The rendering circuit 14 will be explained in detail below.

As shown in FIG. 1, the rendering circuit 14 comprises a digital differential analyzer (DDA) set-up circuit 141, a triangle DDA circuit 142, a texture engine circuit 143, a memory interface (I/F) circuit 144, a CRT control circuit 145, a random access memory digital to analog converter (RAMDAC) circuit 146, a DRAM 147, and a static random access memory (SRAM) 148.

The rendering circuit 14 of the present embodiment is provided with a logic circuit and a DRAM 147 for storing at least display data and texture data together in one semiconductor chip.

The DRAM 147 functions as a texture buffer 147a, a display buffer 147b, z-buffer 147c, and a texture color look-up table (CLUT) buffer 147d.

The DRAM 147 is, as will be explained below, divided into a plurality of modules (four in this embodiment) having the same function.

Indexes in index colors and values of the color look-up table therefor are stored in the texture CLUT buffer 147d in the DRAM 147 for storing more texture data.

The indexes and values of the color look-up table are used for the texture processing. Namely, a texture element is normally expressed by the total 24 bits of the 8 bits of each of R, G, and B. However, the data amount swells up in this way, so one color is selected from among, for example, 256 colors selected in advance, to use for the texture processing. As a result, with 256 colors, the texture elements can be expressed by 8 bits. A conversion table from the indexes to an actual color is necessary, however, the higher the resolution of the texture, the more compact the texture data can become.

Due to this, compression of the texture data becomes possible and the built-in DRAM can be used efficiently.

Further, depth information of the object to be drawn is stored in the DRAM 147 in order to perform hidden plane processing simultaneously and in parallel with the drawing.

Note that as a method of storing the display data, the depth data, and the texture data, the display data is stored continuously from the top of the memory block, then the depth data is stored, and then the texture data is stored in continuous address spaces for each type of texture in the remaining vacant region. As a result, the texture data can be efficiently stored.

DDA Set-up Circuit 141

The DDA set-up circuit 141 performs linear interpolation on the values of the vertexes of the triangle on the physical coordinates in a triangle DDA circuit 142 in its latter part. The DDA set-up circuit 141, prior to obtaining information of the color and depth of the respective pixels inside the triangle, performs a set-up operation for obtaining the sides of the triangle and the difference in a horizontal direction for the data (z, R, G, B, s, t, q) indicated by the polygon rendering data S11.

Specifically, this set-up operation uses values of the starting point and the ending point and the distance between the two points to calculate the variation of the value to find movement for a unit length.

The DDA set-up circuit 141 outputs the calculated variation data S141 to the triangle DDA circuit 142.

Figure 2:
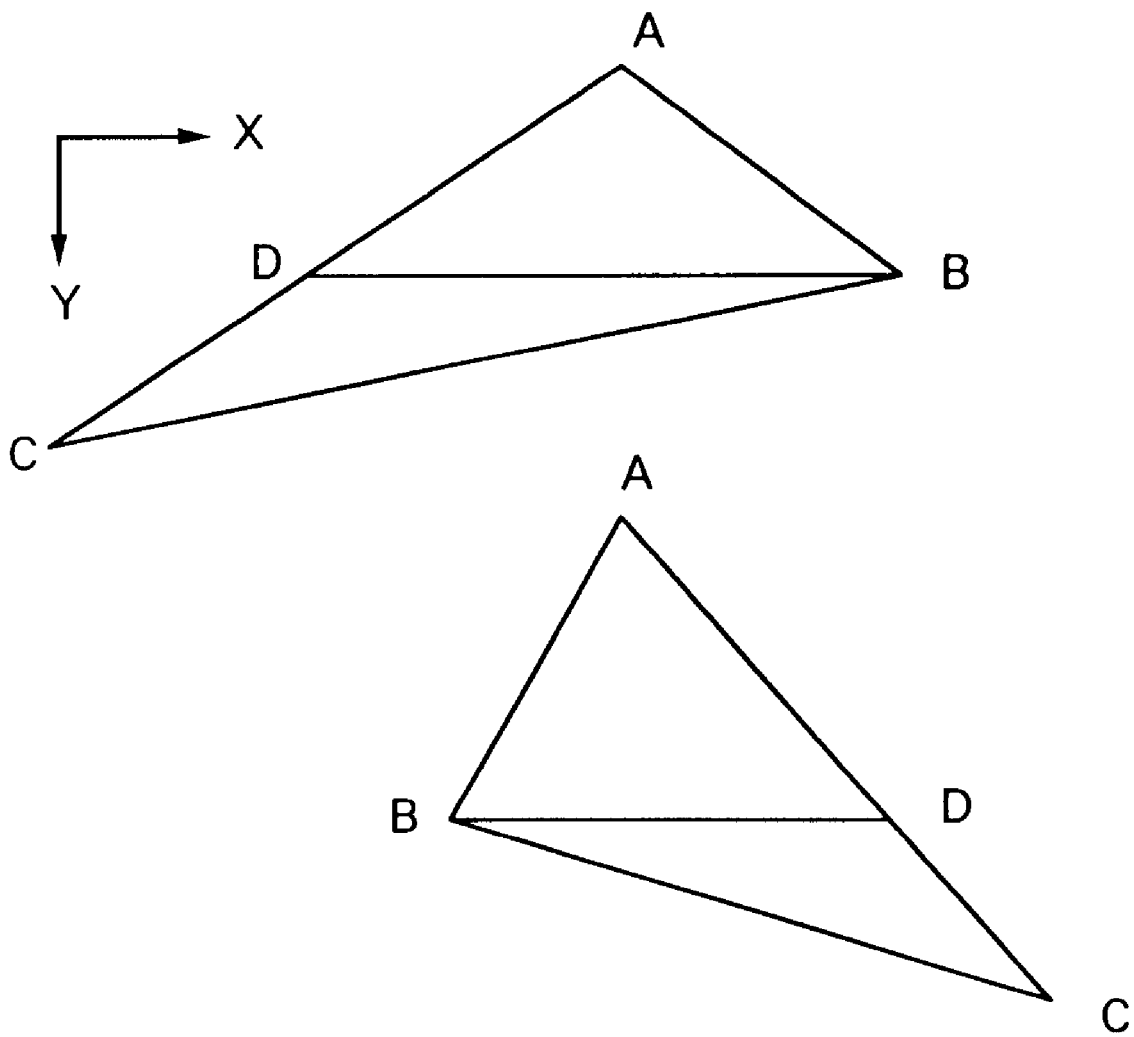
FIG. 2 is a view for explaining the function of a DDA set-up circuit according to the present invention.

The function of the DDA set-up circuit 141 will be further explained with reference to FIG. 2.

As explained above, the main processing of the DDA set-up circuit 141 is to obtain the change inside a triangle composed of three vertexes given various information (color and texture coordinates) at vertexes reduced to physical coordinates through the former geometric processing so as to calculate basic data for the later linear interpolation.

Note that the data of each vertex of the triangle is, for example, configured by 16 bits of x- and y-coordinates, 24 bits of the z-coordinate, 12 bits (=8+4) of the color values for the RGB, and 32 bits of floating decimal values (IEEE format) of the s, t, q texture coordinates.

While the drawing of a triangle is reduced to the drawing of a horizontal line, this makes it necessary to obtain the starting values at the starting point of the drawing of the horizontal line.

In drawing the horizontal line, the direction of drawing is made constant in one triangle. For example, when drawing from the left to the right, the X with respect to a displacement in the Y-direction of a side on the left and the above various changes are calculated first, then these are used to find the X-coordinate of the left-most point when moving from a vertex to the next horizontal line and values of the above various information (points on a side change in both the X- and Y-directions, so calculation is impossible only from the inclination of the Y-direction).

Only the position of the end point is required for the side on the right, so only the change of x with respect to the displacement in the Y-direction need be investigated.

Regarding the drawing of a horizontal line, since the inclination in the horizontal direction is uniform in the same triangle, the inclinations of the above various information are calculated.

The given triangle is sorted in the Y-direction and the upper-most point is set to be A. Next, the remaining two vertexes are compared in terms of the positions in the X-direction and the point on the right is set to be B. By doing this, the processing can be divided into only two or so steps.

Triangle DDA Circuit 142

The triangle DDA circuit 142 uses the variation data S141 input from the DDA set-up circuit 141 to calculate the linearly interpolated (z, R, G, B, s, t, q) data for each pixel inside the triangle.

The triangle DDA circuit 142 outputs the data (x, y) for each pixel and the (z, R, G, B, s, t, q) data at the (x, y) coordinates to the texture engine circuit 143 as DDA data (interpolation data) S142.

For example, the triangle DDA circuit 142 outputs the DDA data S142 of 8 (=2×4) pixels positioned inside a block being processed in parallel to the texture engine circuit 143.

Figure 3:
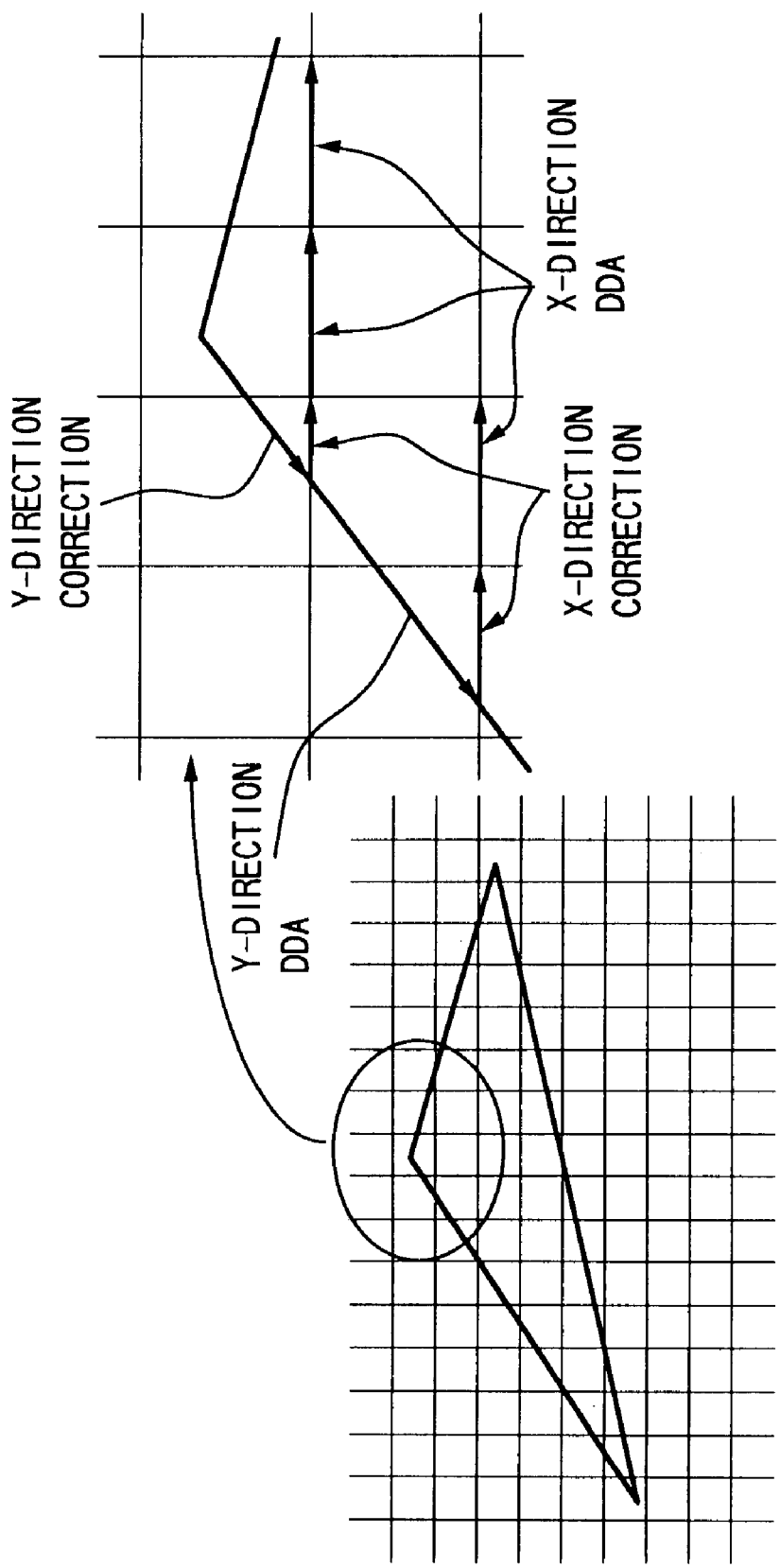
FIG. 3 is a view for explaining the function of a triangle DDA circuit according to the present invention.

A further explanation will be made of the function of the triangle DDA circuit 142 with reference to FIG. 3.

As explained above, inclination information of the above various information of the sides and horizontal direction of a triangle is prepared by the DDA set-up circuit 141. The basic processing of the triangle DDA circuit 142 receiving this information consists of the calculation of the initial values of the horizontal line by interpolation of the various information on the sides of the triangle and the interpolation of the various information on the horizontal line.

Here, what must be noted most is that the calculation of results of the interpolation requires calculation of the values at the center of a pixel.

The reason is that if the value calculated is off from the center of the pixel, while there is not much to worry about in the case of a still picture, the flickering of the image will stand out in a motion picture.

The various information at the left-most side of a first horizontal line (line naturally connecting the centers of pixels) can be obtained by multiplying the inclination on the side with the distance from the vertex to the first line.

The various information at the starting point of the next line can be calculated by adding the inclination of the side.

The value at the first pixel of the horizontal line can be calculated by adding the value obtained by multiplying the distance to the first pixel with the inclination in the horizontal direction to the value at the starting point of the line. The value at the next pixel of the horizontal line can be calculated by adding to the first pixel value the inclination in the horizontal direction successively.

Next, sorting of vertexes will be explained with reference to FIG. 4.

By sorting the vertexes in advance, the branching of the successive processing can be reduced to a minimum and contradictions can be made harder to occur inside one triangle as much as possible even in interpolation.

As the method of sorting, first, all of the vertexes supplied are sorted in the Y-direction and the upper-most point and the lower-most point are defined as the point A and point C, respectively. The remaining point is defined as the point B.

By doing so, in the processing, the side extending the longest in the Y-direction becomes a side AC. First, the side AC and the side AB are used for the interpolation of the region between the two sides, then interpolation is performed for the region between the side BC and the side AC, that is, leaving the side AC as it is and changing from the side AB. Also, it will be understood that it is sufficient to perform processing with respect to the side AC and the side BC for correction on the pixel coordinate lattice in the Y-direction.

Since branching of the processing after sorting becomes unnecessary in this way, the processing can be performed by simply supplying the data, bugs can be prevented from occurring, and the configuration becomes simple.

Also, since the direction of the interpolation in one triangle can be made constant by setting a starting point on the side BC, the direction of interpolation (span) in the horizontal direction becomes constant and any computation errors which occur are accumulated from the side BC to other sides. Since the direction of the accumulation becomes constant, errors between adjacent sides become less conspicuous.

Next, the calculation of the inclination in the horizontal direction will be explained with reference to FIG. 5.

The inclination (variable worth) of the variables (x, y, z, R, G, B, s, t, q) inside a triangle with respect to (x, y) becomes constant due to the linear interpolation.

Accordingly, the inclination in the horizontal direction, that is, the inclination on each of the horizontal lines (span), becomes constant for all spans, so the inclination is obtained prior to the processing of the spans.

As a result of sorting the given vertexes of the triangle in the Y-direction, the side AC is defined again to be the longest extending side, so there is always a point of intersection of a line extending from the vertex B in the horizontal direction and the side AC. The point is defined as D.

After this, by just obtaining the change between the point B and D, the inclination in the horizontal direction, that is, in the x-direction, can be obtained.

Specifically, the x- and z-coordinates at the point D become as shown in the equations below.

Figure 6A:
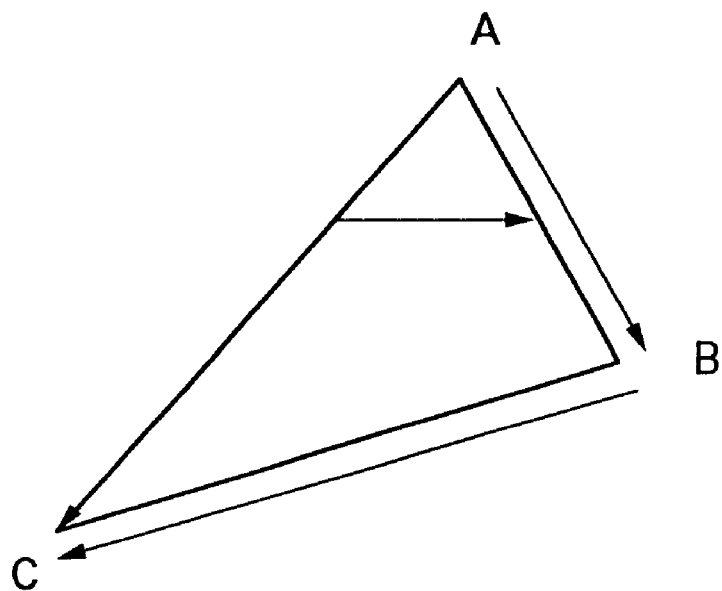
FIG. 6, consisting of FIG. 6A through 6B, is a view for explaining an interpolation routine of vertex data of the triangle DDA circuit according to the present invention.
Figure 6B:
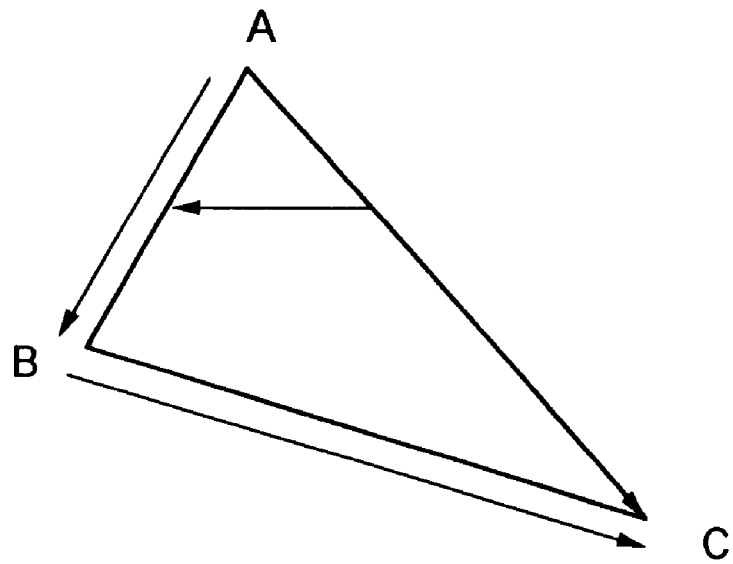

$x_d = \{(y_d - y_a)/(y_c - y_a)\} \cdot (x_c - x_a)$ $z_d = \{(y_d - y_a)/(y_c - y_a)\} \cdot (z_c - z_a)$ When obtaining the inclination of the variable z in the x-direction based on this, the following is obtained:

$\Delta z/\Delta x = (z_d - z_b)/(x_d - x_b) =$ $[\{(y_d - y_a)/(y_c - y_a)\} \cdot (z_c - z_a) - z_b]/$ $[\{(y_d - y_a)/(y_c - y_a)\} \cdot (x_c - x_a) - x_b] =$ $\{z_b(y_c - y_a) - (z_c - z_a)(y_c - y_a)\}/$ $\{x_b(y_c - y_a) - (z_c - z_a)(y_c - y_a)\}$ Next, an example of the routine for interpolation of vertex data will be explained with reference to FIGS. 6A, 6B, and 7.

After the processing for sorting the vertexes, calculating the inclination in the horizontal direction, and calculating the inclination on each of the sides, interpolation is carried out using the results.

Depending on the position of the point B, the processing at a span splits in two directions. This is because it is desired to perform the processing by always using the side extending the longest in the Y-direction as a starting point so as to try to prevent trouble as much as possible by making the direction of accumulation of errors between respective spans in interpolation inside one triangle constant.

When the point B is at the same height as the point A, the first half of the processing is skipped. Therefore, the processing can be streamlined by just providing a skippable mechanism rather than branching.

When trying to improve the processing capability by simultaneously processing a plurality of spans, it is desired to obtain the inclination in the Y-direction, however it is necessary to carry out the processing again from the sorting of the vertexes. However, the processing before the interpolation processing is enough, so the processing system as a whole becomes simpler.

Specifically, when the point B is not the same height as the point A, Y-direction correction of AC and AB (calculation of values on a pixel lattice) is performed (ST1 and ST2) and the interpolation on the side AC and the interpolation on the side AB are performed (ST3).

Then, the correction in the AC horizontal direction and the interpolation on the horizontal line (span) from the side AC in the side AB direction (ST4) are carried out.

The above processing of steps ST3 and ST4 are performed until the end of the side AB (ST5).

When the processing of steps ST2 to ST4 until the end of the side AB is completed or when it is judged at step ST1 that the point B is the same height as the point A, the Y-direction correction of BC (calculation of values on the pixel lattice) is carried out (ST6) and the interpolation on the side AC and the interpolation on the side BC are carried out (ST7).

Then, the correction in the AC horizontal direction and the interpolation on the horizontal line (span) are carried out (ST8).

The processing of the above steps ST7 and ST8 is carried out until the end of the side BC (ST9).

Texture Engine Circuit 143

The texture engine circuit 143 performs the calculation of "s/q" and "t/q", calculation of the texture coordinate data (u, v), and reading of the data (R, G, B) from the texture buffer 147a successively in a pipeline format.

Note that the texture engine circuit 143 performs the processing on the 8 pixels positioned inside a predetermined block simultaneously in parallel.

The texture engine circuit 143 performs the operation for dividing the data s by the data q and the operation for dividing the data t by the data q on the (s, t, q) data indicated by the DDA data S142.

The texture engine circuit 143 is provided with for example eight not illustrated division circuits and performs the division "s/q" and "t/q" simultaneously on the 8 pixels.

Also, the texture engine 143 respectively multiplies the texture sizes USIZE and VSIZE with the division results "s/q" and "t/q" to generate the texture coordinate data (u, v).

The texture engine circuit 143 outputs a read request including the generated texture coordinate data (u, v) to the SRAM 148 or DRAM 147 via the memory I/F circuit 144. As the result the texture engine circuit 143 obtains the (R, G, B) data S148 stored at the texture address corresponding to the data (s, t) by reading the texture data stored in the SRAM 148 or in the texture buffer 147a via the memory I/F circuit 144.

Here, the texture data stored in the texture buffer 147a is stored in the SRAM 148.

The texture engine circuit 143 generates pixel data S143 by multiplying the (R, G, B) data in the read (R, G, B) data S148 and the (R, G, B) data included in the DDA data S142 from the triangle DDA circuit 142 in the former stage.

The texture engine circuit 143 outputs the pixel data S143 to the memory I/F circuit 144.

Note that in the texture buffer 147a, MIPMAP (texture for a plurality of resolutions) or other texture data corresponding to a plurality of reducing rates is stored. Here, texture data of which reducing rate to use is determined for the above triangular unit using a predetermined algorithm.

In the case of a full color mode, the texture engine circuit 143 directly uses the (R, G, B) data read from the texture buffer 147a.

In the case of an index color mode, the texture engine circuit 143 reads a color look-up table (CLUT), prepared in advance, from the texture CLUT buffer 147d, transfers and stores the same in the built-in SRAM, and uses the color look-up table to obtain the (R, G, B) data corresponding to the color index read from the texture buffer 147a.

Memory I/F Circuit 144

The memory I/F circuit 144 compares the z-data corresponding to the pixel data S143 input from the texture engine circuit 143 with the z-data stored in the z-buffer 147c and judges whether the image drawn by the input pixel data is positioned closer to the viewing point than the image written in the display buffer 147b the previous time. When it is judged that the image drawn by the input pixel data S143 is positioned closer, the memory I/F circuit 144 updates the z-data stored in the buffer 147c by the z-data corresponding to the image data S143.

Also, the memory I/F circuit 144 writes the (R, G, B) data to the display buffer 147b.

Note that the DRAM 147 is simultaneously accessed by the memory I/F circuit 144 for 16 pixels.

Figure 8:
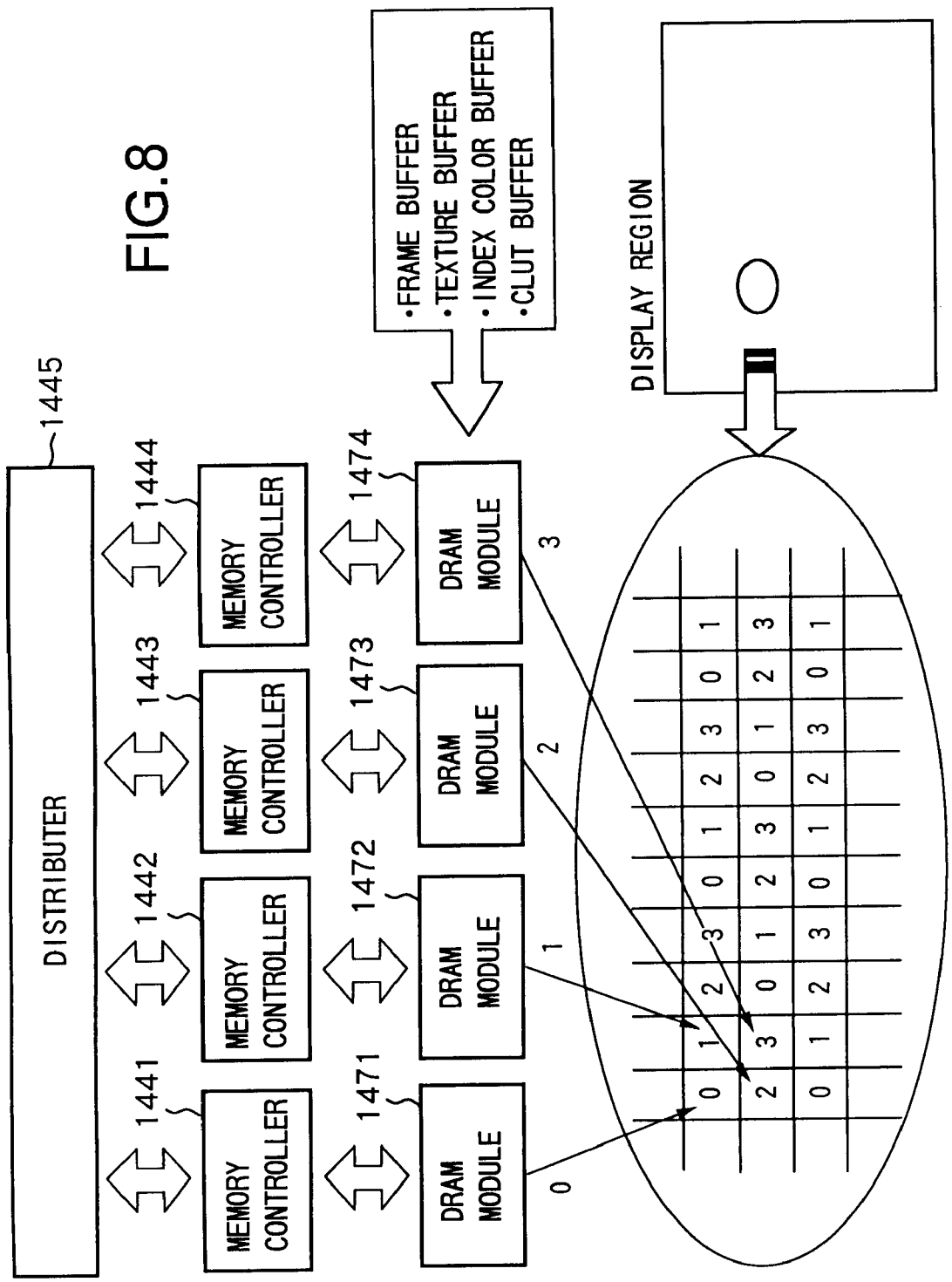
FIG. 8 is a view for explaining a method of storing data according to the present invention.

The DRAM 147 is, for example as shown in FIG. 8, divided into four DRAM modules 1471 to 1474 in this embodiment. The memory I/F circuit 144 is provided with memory controllers 1441 to 1444 corresponding to the respective DRAM modules 1471 to 1474 and a distributer 1445 for distributing data to the memory controllers 1441 to 1444.

The memory I/F circuit 144 arranges the pixel data in order so that the adjacent portions in the display region are in different modules as shown in FIG. 8 for the respective DRAM modules 1471 to 1474.

As a result, when drawing a plane such as a triangle, simultaneous processing is possible, so the operational probabilities of the respective DRAM modules become very high.

CRT Controller Circuit 145

The CRT controller circuit 145 generates an address for display on a not shown CRT in synchronization with the given horizontal and vertical synchronization signals and outputs a request for reading the display data from the display buffer 147b to the memory I/F circuit 144. In response to this request, the memory I/F circuit 144 reads a certain amount of the display data from the display buffer 147b. The CRT controller 145 has a built-in first-in first-out (FIFO) circuit for storing the display data read from the display buffer 147b and outputs the index value of RGB to the RAMDAC circuit 146 at certain time intervals.

RAMDAC Circuit 146

The RAMDAC circuit 146 stores the R, G, B data corresponding to the respective index values, transfers the R, G, B data in a digital form corresponding to the index value of RGB input from the CRT controller 145 to a not illustrated D/A converter (digital/analog converter), and generates R, G, B data in an analog format. The RAMDAC circuit 146 outputs the generated R, G, B data to a not illustrated CRT.

Next, a preferable configuration, arrangement and interconnection method of the logic circuit of the rendering circuit 14 and the secondary memory composed of the DRAM 147 and the SRAM 148 provided together in the same semiconductor chip will be explained with reference to FIGS. 9 and 10.

The above drawing is finally reduced to the access of each and every pixel. Accordingly, the ideal is to increase the drawing performance for exactly the number of parallel processings by simultaneously performing processing of each and every pixel in parallel.

Toward this end, the memory I/F circuit 144 constituting the memory system in the present three-dimensional computer graphic system is also configured to be able to perform simultaneous processing in parallel.

In the graphic drawing processing, as mentioned above, it is learned that a pixel processing circuit must transfer data frequently with the DRAM.

Figure 9:
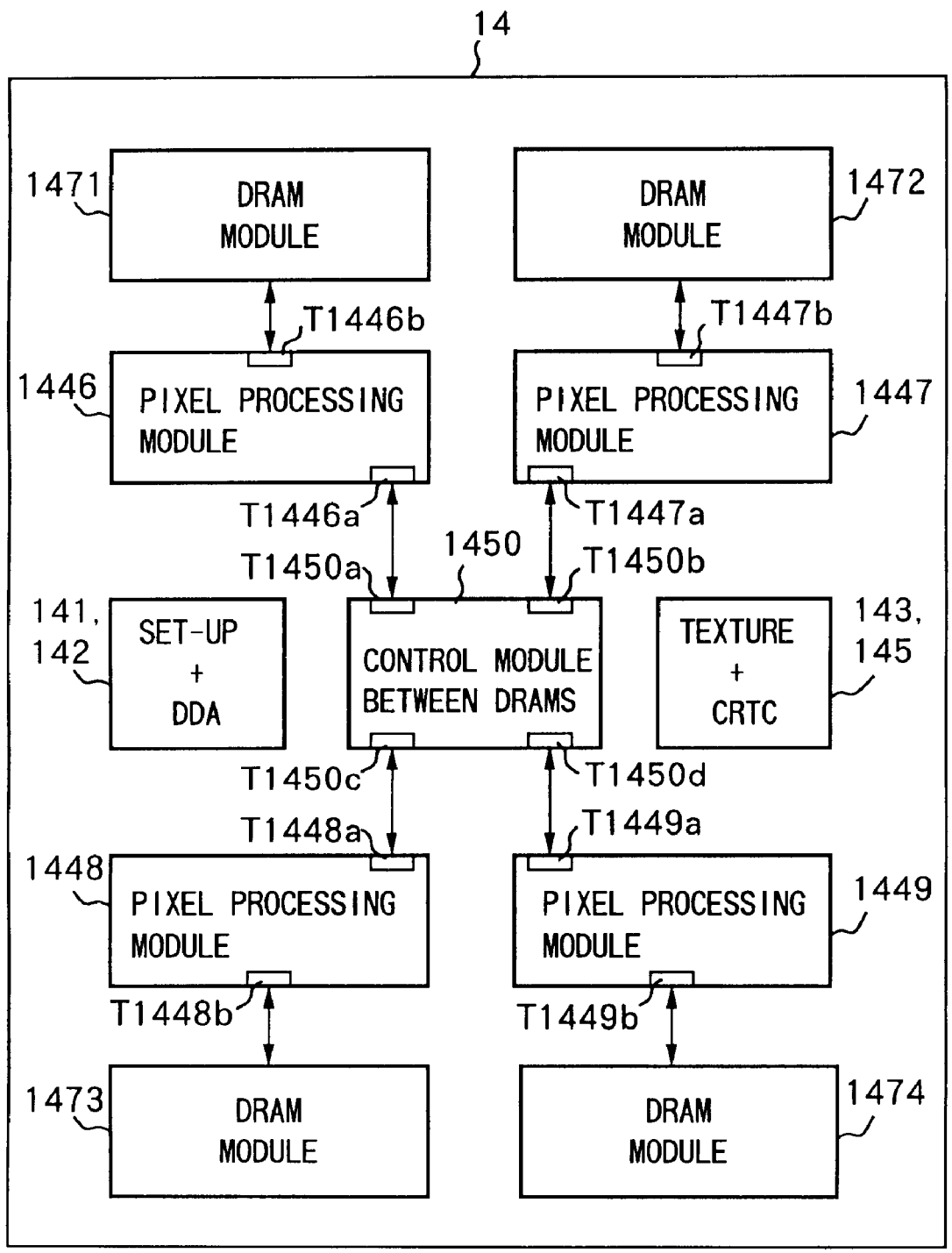
FIG. 9 is a view for explaining a preferable configuration, arrangement, and interconnection method of a logic circuit of the rendering circuit, DRAM, and secondary memory provided together on one semiconductor chip according to the present invention.

Therefore, in the present embodiment, as shown in FIG. 9, pixel processing modules 1446, 1447, 1448, and 1449 serving as function blocks for controlling the pixel processing are physically separated from the memory controller. The pixel processing modules 1446, 1447, 1448, and 1449 are closely arranged to the corresponding DRAM modules 1471, 1472, 1473, and 1474.

The pixel processing modules 1446, 1447, 1448, and 1449 perform all of the read/modify/write processing of the (R, G, B) colors and the processing relating to the work of comparing the depth data previously drawn for the hidden plane processing with the depth of data to be drawn from now and rewriting in accordance with the result.

By performing all of this work in the pixel processing modules 1446, 1447, 1448, and 1449, communication with the DRAM can be completed within modules having short interconnection lengths to the DRAM modules 1471, 1472, 1473, and 1474.

Therefore, even if the number of interconnections with the DRAM, that is, the number of bits for transfer, is increased, the ratio of area occupied by the interconnections can be kept small. Thus, the operating speed can be improved and the interconnection area can be reduced.

With regard to an inter-DRAM control module 1450, including a distributer, the relation with the DRAM modules (DRAM+pixel processing) is stronger comparing with a DDA set up operation of the DDA set-up circuit 141, triangle DDA operation of the triangle DDA circuit 142, texture application of the texture engine circuit 143, and display processing by the CRT control circuit 145 as the drawing processing. The number of signal lines with the DRAM modules 1471, 1472, 1473, and 1474 becomes the largest.

Accordingly, the inter-DRAM control module 1450 is arranged close to the center of the DRAM modules 1471, 1472, 1473, and 1474 in order to make the longest interconnection length as short as possible.

Looking at the signal input/output terminals for connecting the pixel processing modules 1446, 1447, 1448, and 1449 with the inter-DRAM control module 1450, as shown in FIG. 9, the input/output terminals at the pixel processing modules 1446, 1447, 1448, and 1449 are not made the same. The positions of the signal input/output terminals at the pixel processing modules are adjusted so that the individual pixel processing modules and the inter-DRAM control module 1450 are interconnected in the most appropriate (shortest) way.

Specifically, the pixel processing module 1446 has, in FIG. 9, an input/output terminal T1446a formed on the right side of the lower edge portion of the module. The input/output terminal T1446a is arranged to face the input/output terminal T1450a formed on the left side of the upper edge portion of the inter-DRAM control module 1450. The two terminals T1446a and T1450a are therefore connected by the shortest distance.

The pixel processing module 1446, in FIG. 9, has an input/output terminal T1446b for connection with the DRAM module 1471 formed at the center portion of the upper edge portion.

The pixel processing module 1447, in FIG. 9, has an input/output terminal T1447a formed on the left side of the lower edge portion of the module. The input/output terminal T1447a is arranged to face the input/output terminal T1450b formed on the right side of the upper edge portion of the inter-DRAM control module 1450. The two terminals T1447a and T1450b are therefore connected by the shortest distance.

The pixel processing module 1447, in FIG. 9, has an input/output terminal T1447b for connection with the DRAM module 1472 formed at the center portion of the upper edge portion.

The pixel processing module 1448, in FIG. 9, has an input/output terminal T1448a formed on the right side of the upper edge portion of the module. The input/output terminal T1448a is arranged to face the input/output terminal formed on the left side of the lower edge portion of the inter-DRAM control module 1450. The two terminals T1448a and T1450c are therefore connected by the shortest distance.

The pixel processing module, in FIG. 9, has an input/output terminal 1448b for connecting with the DRAM module 1473 formed at the center portion of the lower edge portion.

The pixel processing module 1449, in FIG. 9, has an input/output terminal T1449a formed on the left side of the upper edge portion of the module. The input/output terminal T1449a is arranged to face the input/output terminal T1450d formed on the right side of the lower edge portion of the inter-DRAM control module 1450. The two terminals T1449a and T1450d are therefore connected by the shortest distance.

The pixel processing module 1449, in FIG. 9, has an input/output terminal 1449b for connecting with the DRAM module 1474 formed at the center portion of the lower edge portion.

Note that the pixel processing modules 1446, 1447, 1448, and 1449 are configured so that for processing for which the processing speed request cannot be satisfied even if the paths from the DRAM modules 1471, 1472, 1473, and 1474 to the inter-DRAM control module 1450 are made to be the most appropriate lengths in the above way, they can perform at least one stage of pipeline processing, for example, divided by registers, to enable the desired processing speed to be attained.

Figure 10:
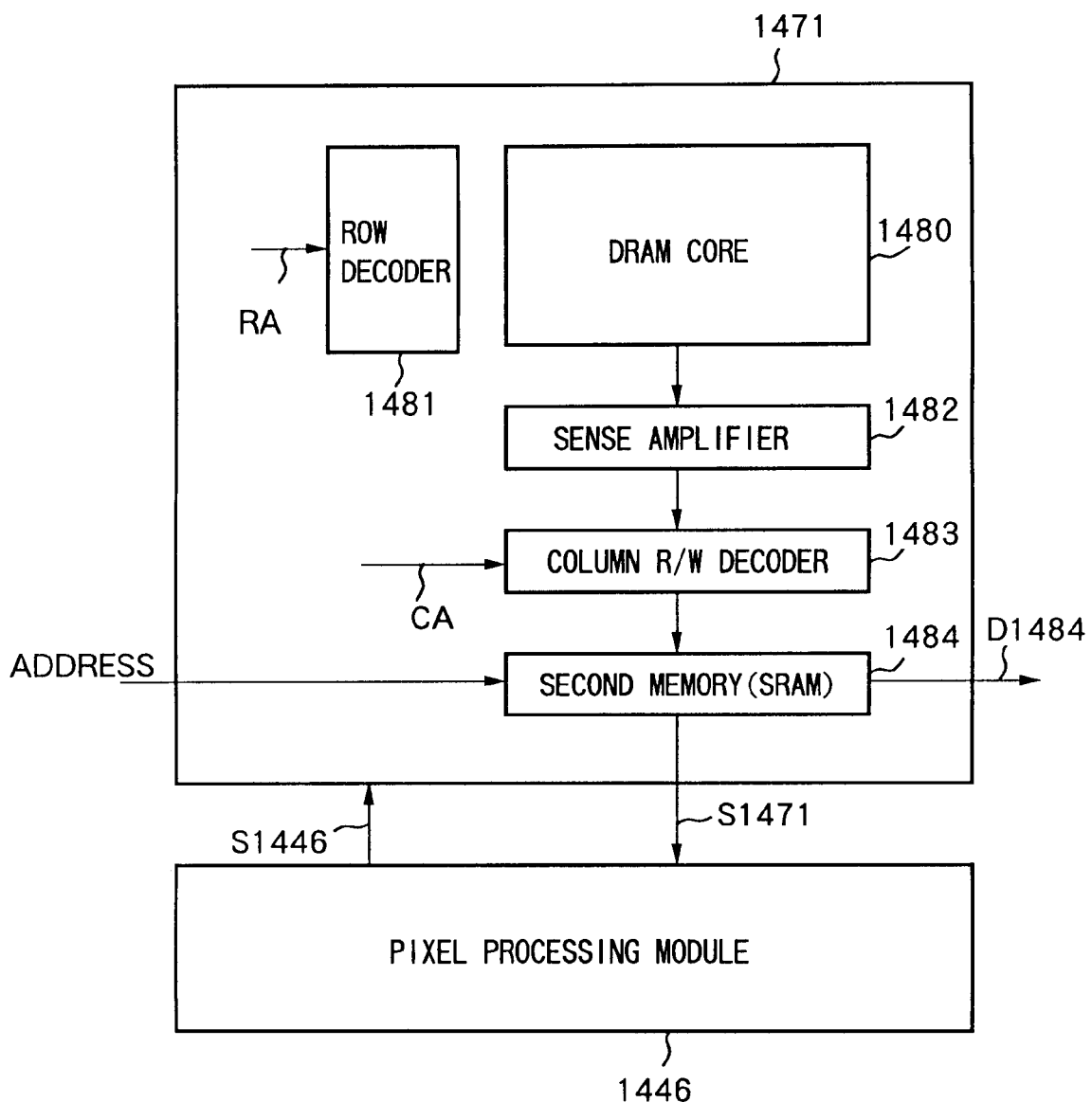
FIG. 10 is a view for explaining an example of the configuration of a DRAM module according to the present invention.
Figure 11:
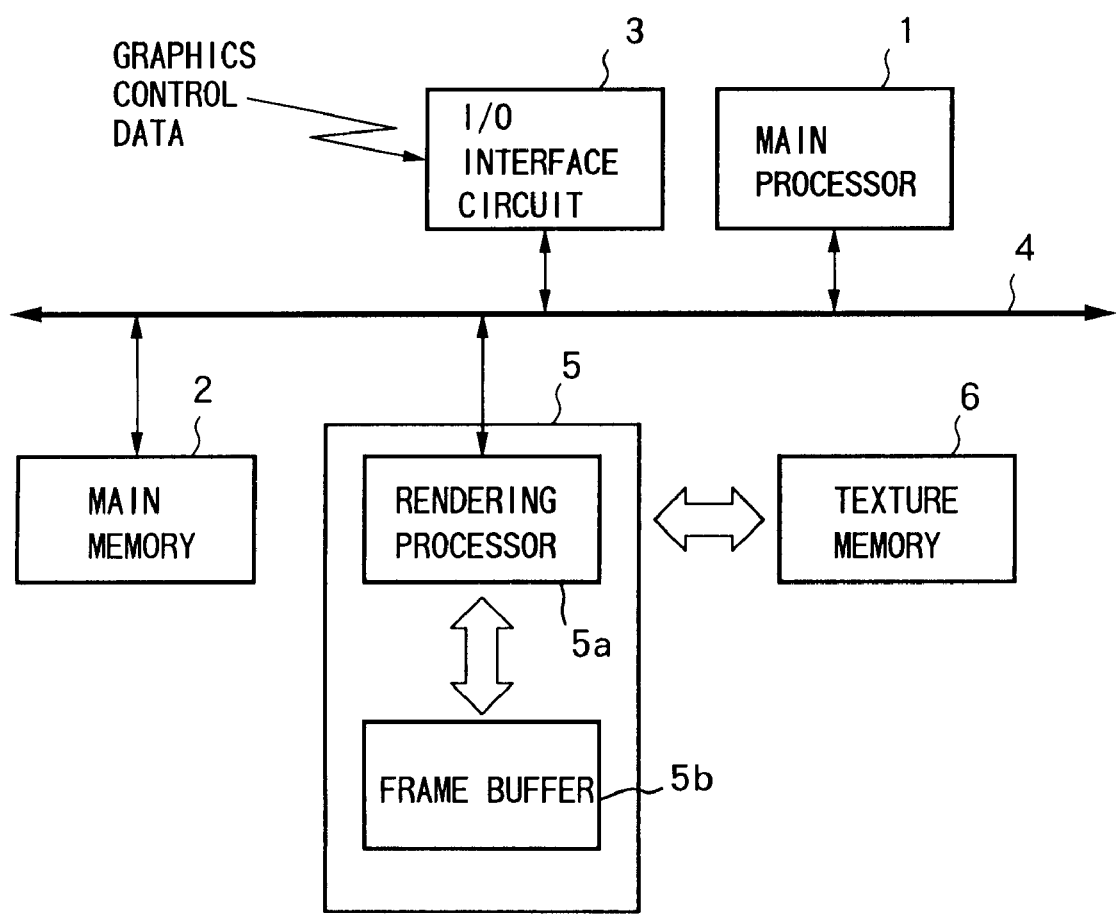
FIG. 11 is a view of the system configuration of the basic concept of a three-dimensional computer graphic system.
Figure 12:
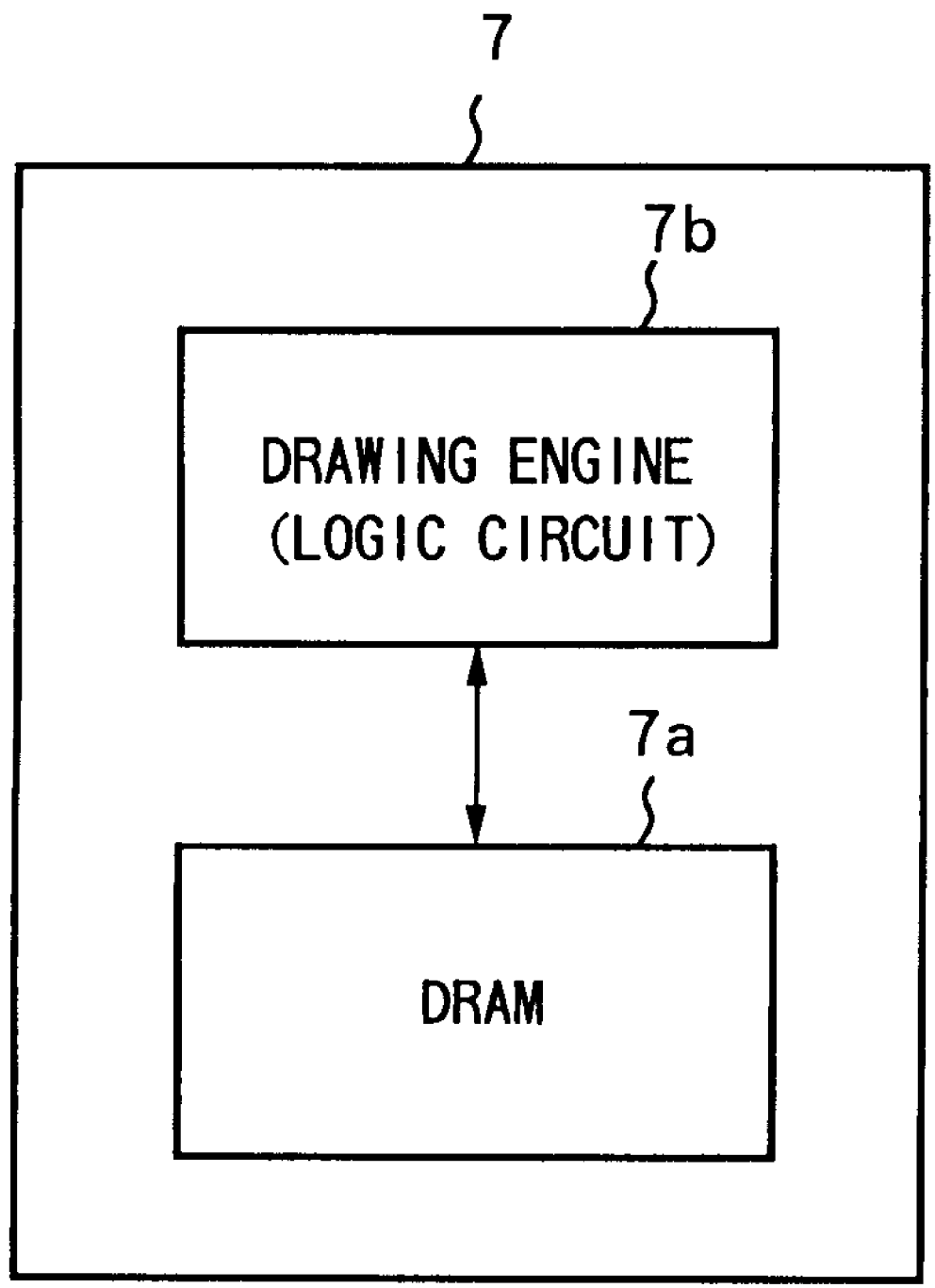
FIG. 12 is a view for explaining the general arrangement and configuration in a case of providing a DRAM having a large capacity and a logic circuit together on a semiconductor chip.
Figure 13:
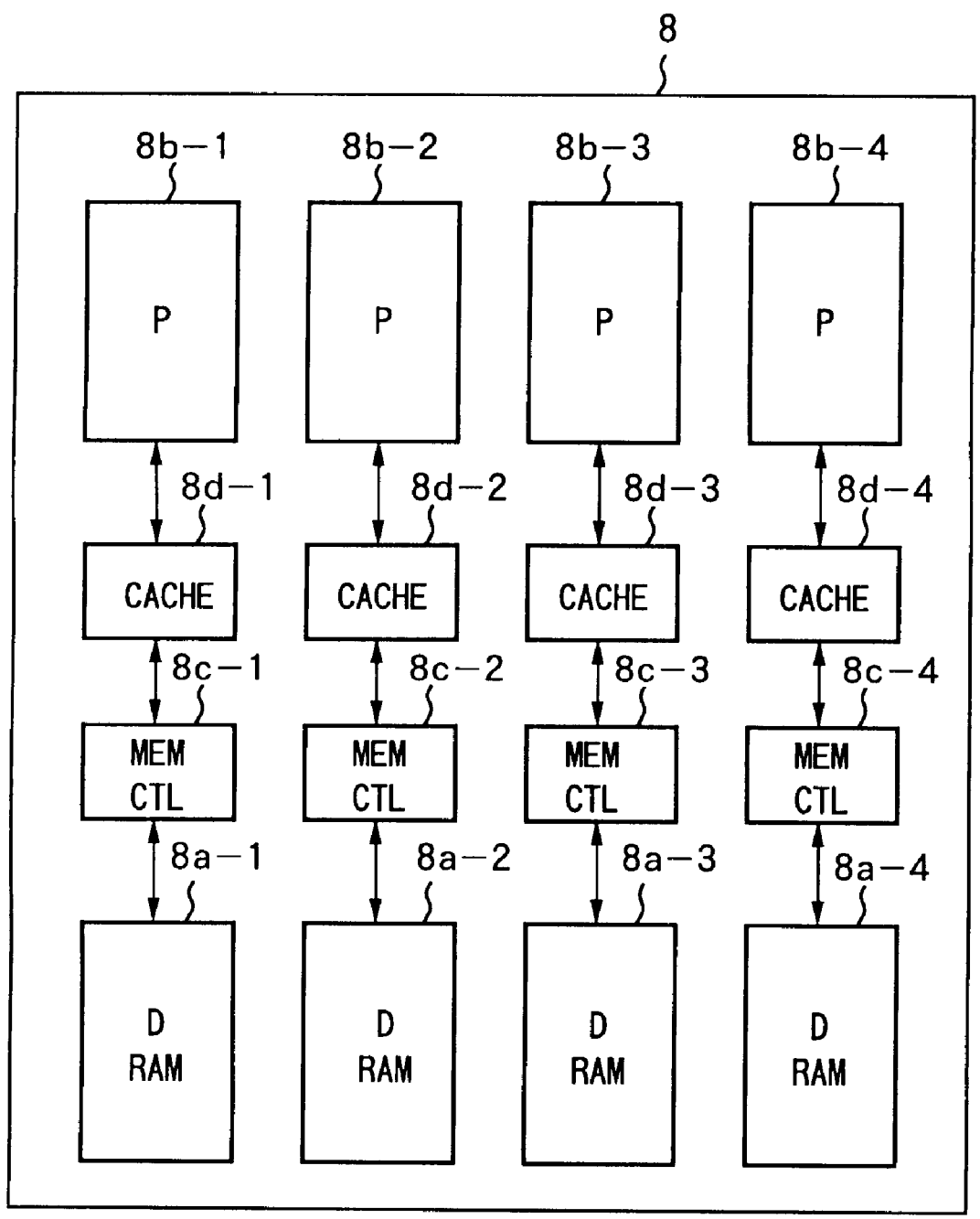
FIG. 13 is a view for explaining an example of the configuration for providing a microprocessor and a memory on one chip.

Also, the DRAM modules 1471 to 1474 according to the present embodiment are configured as shown in FIG. 10. Note that here the explanation is made taking as an example the DRAM module 1471, but the other DRAM modules 1472 to 1474 have the same configurations and therefore explanations thereof are omitted.

The DRAM module 1471, as shown in FIG. 10, comprises a DRAM core 1480 having memory cells arranged in a matrix and accessed via not illustrated word lines and bit lines selected based on a row address RA and column address CA, a row decoder 1481, a sense amplifier 1482, a column decoder 1483, and a secondary memory having the same function as a so-called cache memory composed of an SRAM etc.

As in the present embodiment, for every DRAM module, the pixel processing modules 1446 to 1449 serving as function blocks for controlling the pixel processing in the graphic drawing and the secondary memory 1484 of the DRAM module are closely arranged to the DRAM module.

In this case, the DRAM is arranged so that its so-called longitudinal direction becomes the column direction of the DRAM core 1480.

When looking at random reading in the configuration of FIG. 10, a control signal and a necessary address signal S1446 are supplied from the pixel processing module 1446 to the DRAM module 1471 via an address control path, the row address RA and the column address CA are generated based on the same, and DRAM data corresponding to the desired row is read through the sense amplifier 1482.

The data passing through the sense amplifier 1480 is reduced to the necessary column in accordance with the desired column address CA by the column decoder, and data D1471 of the DRAM corresponding to the desired row/column is transferred from the random access port to the pixel processing module 1446 via a path.

When writing data to the secondary memory, a control signal and necessary address signal S1446 are supplied from the pixel processing module 1446 to the DRAM module 1471 via an address control path. Only a row address is generated based on the same and one row's worth of data is written at one time from the DRAM to the secondary memory 1484 composed of the SRAM 148 etc.

In this case, since the DRAM is arranged so that its longitudinal direction is the column direction of the DRAM core 1480, the one row's worth of data corresponding to the row address can be loaded at a time into the secondary memory 1484 by just designating the row address, that is, the number of bits dramatically increases compared with the case of arrangement in the row direction.

Also, data D1484 is read from the secondary memory (SRAM) 1484 to the texture engine circuit 143 serving as a texture processing module by supplying a control signal and necessary address signal from the texture engine circuit 143 to the DRAM via an address control path and transferring the corresponding data D1484 to the texture engine circuit 143 via a data path.

In the present embodiment, as shown in FIG. 10, the pixel module and the secondary memory of the DRAM module are arranged close to each other on the same side of the long side of the DRAM module.

As a result, data to the pixel processing module and the secondary memory can use the same sense amplifier, so the increase of the area of the DRAM core can be kept to a minimum and two ports can be realized.

Next, the overall operation of the three-dimensional computer graphic system will be explained.

In the three-dimensional computer graphic system 10, data for graphic drawing etc. is given from the main memory 12 of the main processor 11 or from the I/O interface circuit 13 for receiving graphic data from the outside to the rendering circuit 14 via the main bus 15.

Note that, in accordance with need, the data for graphic drawing etc. is subjected to coordinate conversion, clipping, lighting, and other geometrical processing in the main processor 11 etc.

The geometrically processed graphic data becomes polygon rendering data S11 composed of the vertex coordinates x, y, z, of the respective three vertexes of a triangle luminance values R, G, B, and texture coordinates s, t, q corresponding to the pixel to be drawn.

The polygon rendering data S11 is input to the DDA set-up circuit 141 of the rendering circuit 14.

The DDA set-up circuit 141 generates variation data S141 indicating a difference between sides of the triangle and the horizontal direction based on the polygon rendering data S11. Specifically, it uses values of a starting point and ending point and a distance between the two for calculating a change as the amount change of the obtained value when moved for a unit length and outputs the result to the triangle DDA circuit 142 as the variation data S141.

The triangle DDA circuit 142 uses the variation data S141 to calculate the linearly interpolated (z, R, G, B, s, t, q) data of the pixels inside the triangle.

The calculated (z, R, G, B, s, t, q) data and the (x, y) data of the respective vertexes of the triangle are output to the texture engine circuit 143 as DDA data S142.

The texture engine circuit 143 performs the operation of dividing the s data by the q data and the operation of dividing the t data by the q data on the (s, t, q) data indicated by the DDA data S142. It multiplies the division results "s/q" and "t/q" by the texture sizes USIZE and VSIZE to generate the texture coordinate data (u, v).

Next, a read request including the generated texture coordinate data (u, v) is output from the texture engine circuit 143 to the SRAM 148 via the memory I/F circuit 148, and the (R, G, B) data S148 stored in the SRAM 148 is read via the memory I/F circuit 144.

Next, the texture engine circuit 143 multiplies the (R, G, B) data of the read (R, G, B) data S148 and (R, G, B) data included in the DDA data S142 from the triangle DDA circuit 142 of the former stage to generate the pixel data S143.

The pixel data S143 is output from the texture engine circuit 143 to the memory I/F circuit 144.

In the case of a full-color mode, the (R, G, B) data from the texture buffer 147a may be directly used, while in the case of an index color mode, data of a color index table prepared in advance is transferred from the texture CLUT (color look-up table) buffer 147d to a temporary holding buffer composed of an SRAM etc. The actual R. G, B colors are obtained from the color index by using the CLUT of the temporary holding buffer.

Note that when the CLUT is composed of an SRAM, the method of use becomes one where when a color index is input at an address of the SRAM, the output becomes the actual R, G, B colors.

The memory I/F circuit 144 compares the z-data corresponding to the pixel data S143 input from the texture engine circuit 143 and z-data stored in the z-buffer 147c to judge whether or not the image drawn by the input pixel data S143 is positioned closer to the viewing point than the image written in the display buffer the previous time.

When it is judged that the image drawn by the input pixel data S143 is positioned closer, the z-data stored in the z-buffer 147c is replaced by the z-data corresponding to the pixel data S143.

Next, the memory I/F circuit 144 writes the (R, G, B) data into the display buffer 147b.

The memory I/F circuit 144 calculates the memory block storing the texture corresponding to the texture address in the pixel to be drawn from the texture address, outputs a read request only to the memory block, and reads the texture data.

In this case, a memory block which does not hold the corresponding texture data is not accessed for reading the texture, so a longer accessing time for drawing can be provided.

In drawing too, in the same way, the memory block storing the pixel data corresponding to the pixel address to be drawn is accessed to read out the pixel data from that address for modify writing. After modify writing, the data is written back to the same address.

When performing hidden plane processing, again in the same way, the memory block storing the depth data corresponding to the pixel address to be drawn is accessed to read out depth data from the corresponding address. After modify writing, of necessary, this is written back to the same address.

In the transfer of data with the DRAM 147 based on the memory I/F circuit 144, the plurality of processing up to then is processed in parallel. As a result, the drawing performance can be improved.

Especially, by providing the part of the triangle DDA circuit 142 and the texture engine 143 in the same circuit (parallel in space) in a parallel executable form or by inserting a narrow pipeline (parallel in time) to partially increase the operating frequency, a plurality of pixels can be simultaneously calculated.

Also, adjacent portions of the pixel data in the display region are arranged so as to be in the different DRAM modules under the control of the memory I/F circuit 144.

As a result, when drawing a plane such as a triangle, simultaneous processing is carried out on the plane. Therefore, the operating probabilities of the respective DRAM modules are very high.

When displaying the image on a not illustrated display, a display address is generated in synchronization with a given horizontal and vertical synchronizing frequency in the CRT control circuit 145 and a request for display data transfer is output to the memory I/F circuit 144.

In accordance with the request, the memory I/F circuit 144 transfers a certain amount of the display data to the CRT control circuit 145.

The CRT control circuit 145 stores the display data in a not illustrated display FIFO etc. and transfers index values of RGB to the RAMDAC 146 at certain intervals.

The RAMDAC 146 stores RGB values corresponding to the RGB index inside its RAM and transfers the RGB values corresponding to the index value to the not illustrated D/A converter.

Then, an RGB signal converted to an analog form in the D/A converter is transferred to the CRT.

As explained above, according to the present embodiment, a DRAM for storing image data and a logic circuit can be provided together on the same semiconductor chip, the DRAM is divided into a plurality of independent DRAM modules 1471 to 1474, the divided DRAM modules 1471 to 1474 are arranged at the peripheral portions of the logic circuit portion for carrying out the graphic processing etc., therefore, comparing with the case where accesses have to be simultaneous, the ratio of valid data occupying a bit line in one access increases, the distances from the respective DRAM modules 1471 to 1474 to the logic circuit portion become uniform, and the length of the longest path interconnection can be made shorter comparing with the case of arrangement of the modules in one direction in a fixed way. Therefore, there is an advantage that the operating speed can be improved.

Also, since the pixel processing modules 1446 to 1449 are closely arranged as function blocks for controlling the pixel processing in the graphic drawing for each of the DRAM modules 1471 to 1474, the read/modify/write processings performed an extremely large number of times in the graphic drawing can be performed in the very short interconnection region. Therefore, the operating speed can be greatly improved.

Also, since a pixel processing module and a secondary memory of the DRAM module are arranged close to each other on the same side on the long side of a DRAM module, even if data is transferred from the pixel processing module to the secondary memory via a path having a very large width, the operating speed can be improved because the effect of so-called cross talk is small and the interconnection length is naturally short.

Also, data to the pixel processing module and the secondary memory can use the same sense amplifier. Thus, the increase of the area of the DRAM core can be kept to a minimum and it is possible to realize a port.

Since the pixel processing modules 1446 to 1449 perform at least one stage of pipeline control inside, even if the distances to the block placed at the center for carrying out other graphic processing becomes longer in average, it is possible to prevent the through-put of processing data from being affected. Therefore, the processing speed can be improved.

Since the inter-DRAM control module 450 is arranged close to the center point of the DRAM modules 1471, 1472, 1473, and 1474, the interconnection Region can be kept orderly and the average interconnection length can be made shorter.

Also, regarding the signal input/output terminals for connecting the pixel processing modules 1446, 1447, 1448, and 1449 and the inter-DRAM control module 1450, as shown in FIG. 9, since the input/output terminals at the pixel processing modules 1446, 1447, 1448, and 1449 are not made the same, but the positions of the signal input/output terminals of the pixel processing modules are adjusted so that the respective pixel processing modules and the inter-DRAM control module 1450 are interconnected in the most appropriate (shortest) way, even though the functions are same, it is possible to position the terminals of the blocks at the most appropriate position for the positions of arrangement of the blocks, so there is an advantage that the average interconnection length can be shortened.

Also, since the storage modules of the DRAM modules 1471 to 1474 are arranged so that their longitudinal directions are the column direction of the DRAM core, there is an advantage that the one row's worth of data corresponding to the row address can be loaded at one time to the secondary memory by just designating the row address, that is, the number of bits is dramatically increased comparing with the case of arrangement of the modules in the row direction.

Furthermore, since the DRAM 147 built in the semiconductor chip is configured to store display data and the texture data required by at least one graphic element, the texture data can be stored in a portion other than the display region and the built-in DRAM can be efficiently used. Thus, an image processing apparatus capable of both performing high speed processing and reducing the power consumption can be realized.

Further, a single memory system can be realized and all of the processing can be carried out only in the built-in structure. As a result, there is a large paradigm shift in terms of the architecture as well.

Also, since the memory can be efficiently used, processing can be carried out only in the built-in DRAM and the wide bandwidth between the memory and the drawing system attained due to being built in can be sufficiently used. Further, special processing can be installed in the DRAM as well.

Further, efficient usage of the bit lines becomes possible by arranging the display elements of adjacent addresses to be in different blocks of the DRAM from each other in the display address space. When there are frequent accesses to relatively fixed display regions as in drawing graphics, the probability increases of the modules being able to perform processing simultaneously and the drawing performance can be improved.

Further, since indexes of index colors and values of a color look-up table therefor are stored inside the built-in DRAM 147 in order to store more texture data, the texture data can be compressed and the built-in DRAM can be efficiently used.

Also, since depth information of an object to be drawn is stored in the built-in DRAM, hidden plane processing can be performed simultaneously and in parallel with the drawing.

Normally, the drawn picture is desired to be displayed, however, since it is possible to store the texture data and the display data together as a unified memory in the same memory system, the drawing data can be used as texture data instead of being used for direct display.

This is effective when preparing the necessary texture data by drawing when necessary. This is also an effective function for preventing the amount of the texture data from swelling.

Also, by providing the DRAM inside the chip, the high speed interface portion is completed just inside the chip, so it is no longer necessary to drive an I/O buffer having a large additional capacity or an interconnection capacity between chips. Therefore, the power consumption can be reduced compared with a not built-in case.

Accordingly, a setup which uses a variety of techniques to enable everything to be accommodated in a single chip is becoming an essential technical element for future digital equipment such as portable data terminals.

Note that the present invention is not limited to the above embodiments.

Also, in the above three-dimensional computer graphic system 10 shown in FIG. 1, a configuration using an SRAM 148 was given as an example, however, the system may be configured without the SRAM 147.

Furthermore, in the three-dimensional computer graphic system 10 shown in FIG. 1, an example was given wherein the geometrical processing for generating polygon rendering data was carried out in the main processor 11, however, the system may be configured to carry out the geometrical processing in the rendering circuit 14.

Summarizing the effects of the invention, as explained above, according to the present invention, the performance of pixel processing which is the most frequently carried out in graphics can be greatly improved, and the average interconnection length and the longest interconnection length between the storage modules and the drawing modules can be made shorter. As a result, an image processing apparatus having a small chip area and a light interconnection capacity for driving due to a small interconnection area and which can improve the operating speed and the power consumption can be realized.

Also, according to the present invention, due to the storage circuit provided together with the logic circuit on the semiconductor chip being configured to store the display data and the texture data required by at least one graphic element, the texture data can be stored in portions other than the display region, the built-in storage circuit can be efficiently used, and an image processing apparatus capable of performing high speed processing as well as reducing the power consumption can be realized.

While the invention has been described with reference to specific embodiment chosen for purpose of illustration, it should be apparent that numerous modifications could be made thereto by those skilled in the art without departing from the basic concept and scope of the invention.

What is claimed is:

1. An image processing apparatus comprising:
    a storage circuit, said storage circuit including a plurality of storage modules, a storage module of said plurality of storage modules storing a portion of an image, said portion of said image being stored as image data;
    a control module, said control module controlling said plurality of storage modules; and
    a logic circuit, said logic circuit including a plurality of pixel processing modules, a pixel processing module of said plurality of pixel processing modules being associated with only one storage module of said plurality of storage modules, said pixel processing module processing said image data, said logic circuit processes said image data using said image data stored within said storage circuit,
    wherein said storage circuit and said logic circuit are accommodated on one semiconductor chip.

2. An image processing apparatus as set forth in claim 1, wherein said logic circuit is divided into a plurality of pixel processing modules corresponding to the storage modules and each corresponding pixel processing module is closely arranged to each storage module.

3. An image processing apparatus as set forth in claim 2, wherein a pixel processing block performs at least one stage of pipeline processing therein.

4. An image processing apparatus as set forth in claim 2, wherein said plurality of pixel processing modules, even if for modules having the same function, are changed in the positions of their terminals for taking out paths so as to enable paths to be optimally laid to pixel processing modules using paths from the storage modules.

5. An image processing apparatus as set forth in claim 2, further comprising a control block equivalently connected to all of the storage modules for controlling the operations of the above plurality of storage modules and that control block is arranged close to a center point surrounded by the storage modules.

6. An image processing apparatus as set forth in claim 1, comprising a secondary memory capable of storing stored data of said storage module and said secondary memory closely arranged to said storage module.

7. An image processing apparatus as set forth in claim 1, wherein said storage modules are arranged at peripheral portions of said logic circuit so as to surround the logic circuit and wherein input/output terminals are arranged at the inside edges facing said logic circuit.

8. An image processing apparatus as set forth in claim 1, wherein:
    said storage circuit is accessed based on a row address and a column address;
    said logic circuit is divided into a plurality of pixel processing modules corresponding to the storage modules, a corresponding pixel processing module being closely arranged at each storage module;
    there is a secondary memory capable of storing the stored data of a storage module, which secondary memory is arranged close to a storage module;
    said storage module is arranged so that it s longitudinal direction is the column direction of a core; and
    said pixel processing module and said secondary memory are arranged close to each other on the same side of the long side of the storage module.

9. An image processing apparatus as set forth in claim 1, wherein said control module is centrally located from said plurality of storage modules, said plurality of storage modules surrounding said control module.

10. An image processing apparatus as set forth in claim 1, wherein said control module is centrally located from said plurality of pixel processing modules, said plurality of pixel processing modules surrounding said control module.

11. An image processing apparatus as set forth in claim 1, wherein said plurality of storage modules are arranged at peripheral portions of said logic circuit.

12. An image processing apparatus as set forth in claim 1, wherein said storage module includes a core memory and a cache memory.

13. An image processing apparatus as set forth in claim 1, wherein said portion of said image is stored within said storage module and an adjacent portion of said image is stored within a different storage module of said plurality of storage modules.

14. An image processing apparatus as set forth in claim 1, wherein said storage circuit stores depth data for said image.

15. An image processing apparatus as set forth in claim 14, said depth data is used to perform hidden plane processing, said hidden plane processing being performed while presenting said image to said display.

16. An image processing apparatus as set forth in claim 1, wherein said storage circuit includes a texture buffer, a display buffer, a z-buffer and a texture color look-up table.

17. An image processing apparatus as set forth in claim 1, wherein said image data include display data, depth data and texture data.

18. An image processing apparatus as set forth in claim 1, wherein said pixel processing module is located on said semiconductor chip at one location and said only one storage module is located on said semiconductor chip at another location, an electrical connection between said pixel processing module and said only one storage module having a length, said length being the shortest distance between said pixel processing module and said only one storage module.

19. An image processing apparatus as set forth in claim 1, wherein said logic circuit further comprises:
    a plurality of memory controllers, a memory controller of said plurality of memory controllers corresponding to said only one storage module; and
    a distributer, said distributer distributing data to said memory controller.

20. An image processing apparatus as set forth in claim 19, wherein said memory controller is physically separated from said each pixel processing module.

21. An image processing apparatus as set forth in claim 1, wherein said pixel processing module performs read/modify/write processing of colors.

22. An image processing apparatus as set forth in claim 1, wherein said pixel processing module performs hidden plane processing.

23. An image processing apparatus as set forth in claim 22, wherein said hidden plane processing is performed by comparing depth data from a image previously displayed with depth data for an image to be displayed.

24. An image processing apparatus as set forth in claim 1, wherein said pixel processing module performs pipeline processing therein.

25. An image processing apparatus as set forth in claim 1, wherein said logic circuit includes an interpolation data generating circuit and a texture processing circuit, said interpolation data generating circuit performs interpolation on polygon rendering data of the vertexes of a unit graphic to generate interpolation data of pixels positioned inside said unit graphic; and said texture processing circuit divides the homogeneous coordinates (s, t) of texture included in interpolation data by the homogeneous term q to generate "s/q" and "t/q", using texture addresses in accordance with said "s/q" and said "t/q" to read texture data from said storage circuit, said texture processing circuit performs processing for applying said texture data to the surface of the graphic elements of said image data.

26. An image processing apparatus for performing rendering by receiving polygon rendering data including three-dimensional coordinates (x, y, z), R (red), G (green), and B (blue) data, homogeneous coordinates (s, t) of texture, and a homogeneous term q for vertexes of a unit graphic comprising:

a storage circuit divided into a plurality of storage modules, each storage module storing display data of different pixels and texture data required by at least one graphic element;

a logic circuit comprising at least an interpolation data generating circuit for performing interpolation on the polygon rendering data of the vertexes of said unit graphic to generate interpolation data of pixels positioned inside said unit graphic and a texture processing circuit for dividing the homogeneous coordinates (s, t) of texture included in said interpolation data by the homogeneous term q to generate "s/q" and "t/q", using texture addresses in accordance with said "s/q" and "t/q" to read texture data from said storage circuit, and performing processing for applying the texture data to the surface of the graphic elements of the display data, said logic circuit including a plurality of pixel processing blocks and a control module, said control module having a plurality of control module terminals, each pixel processing block of said plurality of pixel processing blocks processing said image data, a first processing block of said plurality of pixel processing blocks being connected to only a first storage module of said plurality of storage modules and being connected to a first control module terminal of said plurality of control module terminals;

said storage circuit and said logic circuit being both accommodated on one semiconductor chip.

27. An image processing apparatus as set forth in claim 26, wherein said logic circuit is divided into said plurality of pixel processing blocks corresponding to the storage modules and each corresponding pixel processing block is closely arranged to each storage module.

28. An image processing apparatus as set forth in claim 27, wherein a pixel processing block performs at least one stage of pipeline processing therein.

29. An image processing apparatus as set forth in claim 27, wherein said plurality of pixel processing blocks, even if for modules having the same function, are changed in the positions of their terminals for taking out paths so as to enable paths to be optimally laid to pixel processing blocks using paths from the storage modules.

30. An image processing apparatus as set forth in claim 27, further comprising a control block equivalently connected to all of the storage modules for controlling the operations of the above plurality of storage modules and that control block is arranged close to a center point surrounded by the storage modules.

31. An image processing apparatus as set forth in claim 26, comprising a secondary memory capable of storing stored data of a storage module and the secondary memory closely arranged to said storage module.

32. An image processing apparatus as set forth in claim 26, wherein said storage modules are arranged at peripheral portions of said logic circuit so as to surround the logic circuit and wherein input/output terminals are arranged at the inside edges facing said logic circuit.

33. An image processing apparatus as set forth in claim 26, wherein:

said storage circuit is accessed based on a row address and a column address;

said logic circuit is divided into a plurality of pixel processing blocks corresponding to the storage modules, a corresponding pixel processing block being closely arranged at each storage module;

there is a secondary memory capable of storing the stored data of a storage module, which secondary memory is arranged close to a storage module;

said storage module is arranged so that its longitudinal direction is the column direction of a core; and said pixel processing block and said secondary memory are arranged close to each other on the same side of the long side of the storage module.

34. An image processing apparatus as set forth in claim 26, wherein said plurality of divided storage modules are arranged at peripheral portions of said logic circuit.

35. An image processing apparatus as set forth in claim 26, wherein a second processing block of said plurality of pixel processing blocks is connected to a second control module terminal of said plurality of control module terminals.

36. An image processing apparatus as set forth in claim 25, wherein said second processing block is connected to only a second storage module of said plurality of storage modules.

* * * * *